US008321793B1

(12) United States Patent
Cotter et al.

(10) Patent No.: US 8,321,793 B1
(45) Date of Patent: Nov. 27, 2012

(54) SYSTEM, METHOD, AND COMPUTER PROGRAM FOR RECOMMENDING WEB CONTENT TO A USER

(75) Inventors: Paul Cotter, Stillorgan (IE); Bartosz Jablonski, Legnica (PL); Damien Plower, Clonsilla (IE); Keith Bradley, Sandyford (IE)

(73) Assignee: Amdocs Software Systems Limited, Dublin (IE)

( * ) Notice: Subject to any disclaimer, the term of this patent is extended or adjusted under 35 U.S.C. 154(b) by 238 days.

(21) Appl. No.: 12/487,418

(22) Filed: Jun. 18, 2009

Related U.S. Application Data

(60) Provisional application No. 61/077,721, filed on Jul. 2, 2008.

(51) Int. Cl.
*G06F 3/00* (2006.01)

(52) U.S. Cl. ........ 715/745; 715/280; 715/738; 715/744; 715/789; 715/794; 707/741; 707/748; 707/751; 707/752

(58) Field of Classification Search .................. 715/744, 715/745, 747, 760, 205–207, 243, 251, 253, 715/273, 277, 705, 708, 712, 713, 733–739, 715/764, 766, 788, 789, 794, 796, 806–807, 715/866; 707/736, 741, 748, 751, 752
See application file for complete search history.

(56) References Cited

U.S. PATENT DOCUMENTS

| 7,310,632 | B2 * | 12/2007 | Meek et al. ................... 707/709 |
| 2003/0058270 | A1 * | 3/2003 | Keohane et al. .............. 345/738 |
| 2003/0065706 | A1 * | 4/2003 | Smyth et al. .................. 709/200 |
| 2005/0165903 | A1 * | 7/2005 | Doan et al. .................... 709/217 |
| 2006/0053090 | A1 * | 3/2006 | Cotter et al. ...................... 707/3 |
| 2006/0282444 | A1 * | 12/2006 | Chen et al. .................... 707/100 |
| 2006/0282445 | A1 * | 12/2006 | Chen et al. .................... 707/100 |
| 2007/0260627 | A1 * | 11/2007 | Knittel et al. ................. 707/101 |
| 2008/0021858 | A1 * | 1/2008 | Dolph .............................. 707/1 |
| 2009/0292667 | A1 * | 11/2009 | Takahashi ....................... 706/52 |
| 2010/0114914 | A1 * | 5/2010 | Gerges et al. ................. 707/751 |

* cited by examiner

*Primary Examiner* — Tuyetlien Tran
*Assistant Examiner* — Enrique Iturralde
(74) *Attorney, Agent, or Firm* — Zilka-Kotab, PC

(57) ABSTRACT

A system, method, and computer program product are provided for recommending web content to a user. In one embodiment, a user is directed to a page of a website, the page including links to a plurality of subpages. Additionally, a number of visits by the user directed from the page to each of the subpages are tracked. Further, one of the subpages with a highest number of visits is designated as a new entry page for the user. Moreover, the user is automatically redirected to the new entry page during subsequent visits by the user to the website.

19 Claims, 4 Drawing Sheets find the most popular entry page then look for popular children.

SYSTEM, METHOD, AND COMPUTER PROGRAM FOR RECOMMENDING WEB CONTENT TO A USER

RELATED APPLICATION(S)

The present application claims priority to U.S. Provisional Patent Application No. 61/077,721, entitled "A Method For Recommending Web Content To A User" and filed Jul. 2, 2008, which is hereby incorporated by reference.

FIELD OF THE INVENTION

The present invention relates to web content, and more particularly to web content recommendations.

BACKGROUND

A key challenge in profiling users' behavior on the Web is to know which content to recommend to a user: Domain recommendations, where the user is directed to the homepage of a given site, while somewhat effective, have traditionally been severely limited. For example, a site may contain many sub sections of widely varying content and hence of interest to widely different groups. This site is fairly typical of a large internet Web site with many magazine and news services having similar breadth of content and structure.

One conventional solution provided by search engines allows the user to explicitly specify his topic of interest in his query, which allows the search engine to focus on the relevant part of the web site. Further enhancements of this approach allow for content so discovered to be rated according to its likely utility e.g. Google™ Page Rank, Google™ Site Links, etc. While effective, it unfortunately requires the user to explicitly state his information goal. Another approach has been to offer the most popular subsections on this site as a form of recommendation or the most recently popular buzz sections within the site. While again effective, this approach is limited to what is popular and requires the user to go to the site's home page or other intervening page to see these recommendations. Yet another approach uses Really Simple Syndication (RSS) feeds to keep users appraised of current items of interest to them in a given site or section thereof. Again this approach requires the user to manually identify and subscribe to different feeds.

There is thus a need for addressing these and/or other issues associated with the prior art.

SUMMARY

A system, method, and computer program product are provided for recommending web content to a user. In one embodiment, a user is directed to a page of a website, the page including links to a plurality of subpages. Additionally, a number of visits by the user directed from the page to each of the subpages are tracked. Further, one of the subpages with a highest number of visits is designated as a new entry page for the user. Moreover, the user is automatically redirected to the new entry page during subsequent visits by the user to the website.

In another embodiment, activity of a user on each of a plurality of webpages of a website is tracked. In addition, at least one of the webpages is determined as a preferred page for the user based on the activity. Furthermore, the at least one of the webpages is designated as an entry page of the website for the user.

In yet another embodiment, activity of each of a plurality of users of a community on each of a plurality of webpages of a website is tracked. Additionally, one of the webpages is selected based on the activity. Further, the selected webpage is recommended to the community of users.

DETAILED DESCRIPTION

Figure 1:
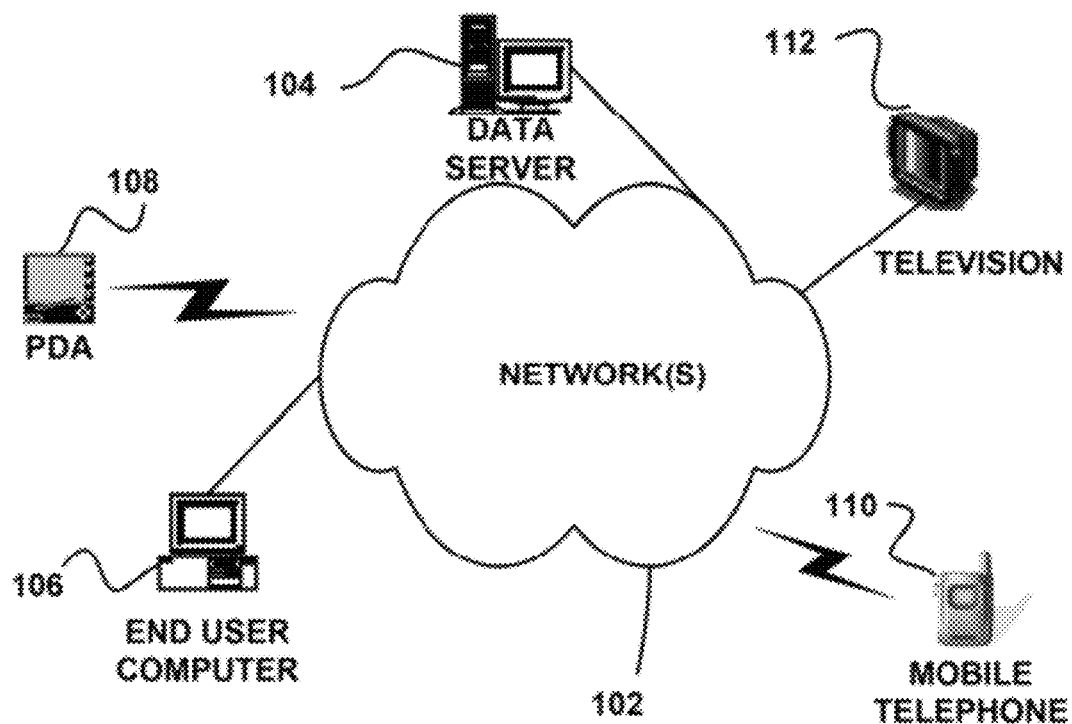
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
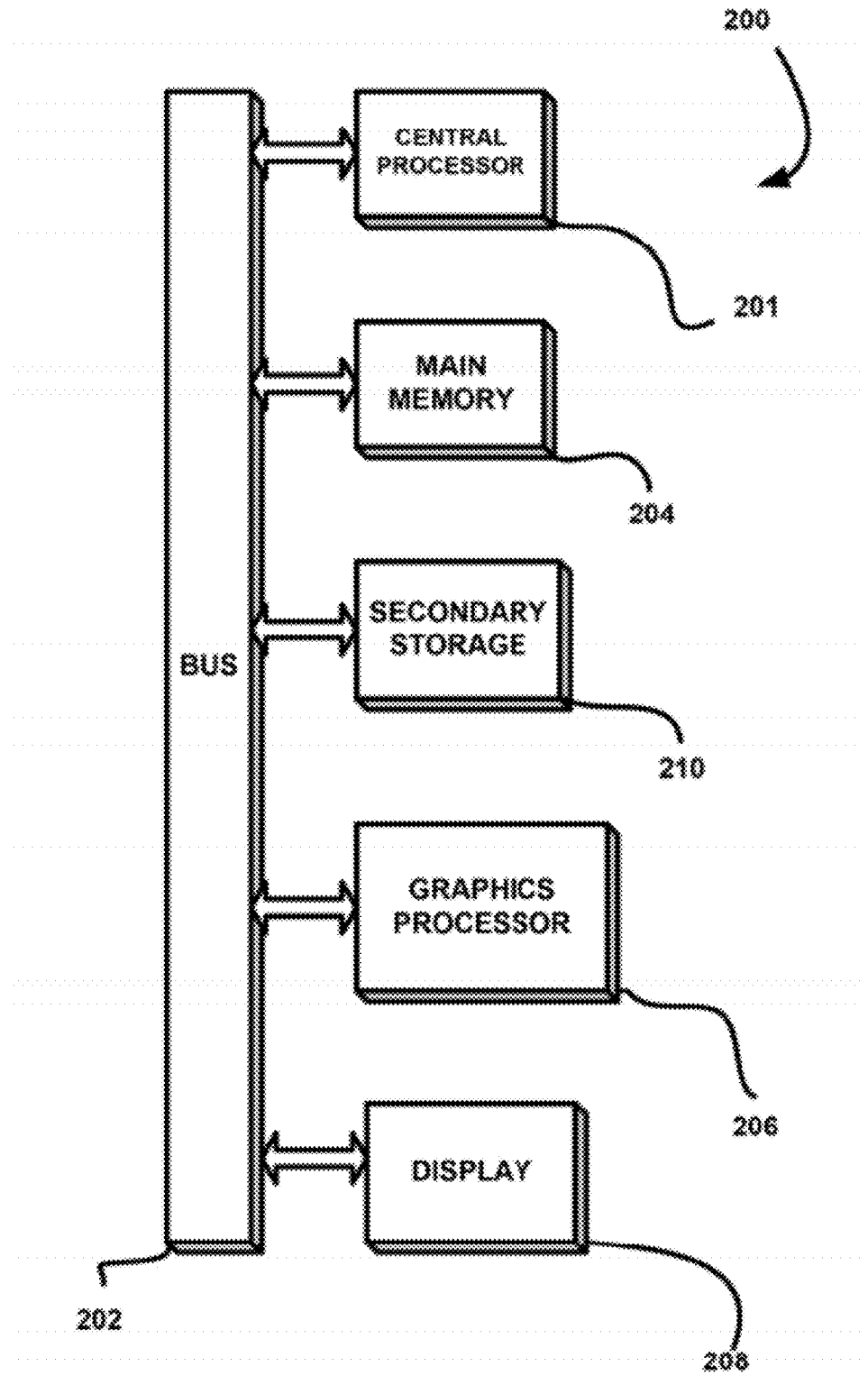
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

In one embodiment, a user is directed to a page of a website, the page including links to a plurality of subpages. With respect to the present description, the website may include any network site which includes at least one page. For example, the website may include an Internet website.

In addition, the page of the website may include any interface [e.g. graphical user interface (GUI)] of the website to which a user may be directed. In one embodiment, the page of the website may include an entry page of the website. The entry page may include any page initially presented to the user upon entry of the user to the website (e.g. upon entering a web address of the website into a browser, etc.).

Thus, in one embodiment, the user may be automatically directed to the page of the website upon entry of the user to the website. Of course, in another embodiment, the user may be directed to the page of the website upon selection by the user of a link (e.g. on another page of the website, on another page of another website, etc.) to the page.

Additionally, a number of visits by the user directed from the page to each of the subpages are tracked. Further, one of the subpages with a highest number of visits is designated as a new entry page for the user. For example, the subpage may be designated as the new entry page only if the subpage is visited by the user more than a threshold amount in comparison to visits by the user to the other subpages. Moreover, the user is automatically redirected to the new entry page during subsequent visits by the user to the website.

In another embodiment, activity of a user on each of a plurality of webpages of a website is tracked. In addition, at least one of the webpages is determined as a preferred page for the user based on the activity. Furthermore, the at least one of the webpages is designated as an entry page of the website for the user.

In yet another embodiment, activity of each of a plurality of users of a community on each of a plurality of webpages of a website is tracked. As an option, the users of the community may share at least one common interest (e.g. visited webpages, etc.). Additionally, one of the webpages is selected based on the activity. For example, the selected webpage may be held in common in an activity profile history of a predefined number of the users. Further, the selected webpage is recommended to the community of users.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

As described above, a method of determining which part of a given site interests a user is provided by learning from the user's browsing pattern within that site. This method automatically identifies which part of a site the user is interested in by eliminating repeating navigations which the user habitually undergoes in order to arrive at their area of interest.

This is inspired by on-portal intelligent navigation and may be used to promote user's favorite off-portal services onto the portal. This may enrich the user's on-portal browsing experience providing easy access to more of the services the user wants.

The web content recommendation system may identify off-portal uniform resource locators (URLs) of webpages that can be recommended to users. For example, thousands of users browse the BBC web site but they are not all interested in the same content. Although many start at the home page they then proceed to drill down into the site going to travel, cookery or other sub pages or sections. The homepage and most popular pages on the site are therefore not representative of the user's interests and not of most interest to the users.

In addition to identifying good recommendable content the URLs thus identified can be used as the basis of a user profile. Ordinarily, a profile based on Web browsing alone may contain many irrelevant sites or pages which do not add to a clear picture of the users' interests. For example the BBC, CNET or MSN homepages tell us little about what the user is interested in on those sites. By contrast the current method may allow determine that the user in interested in the travel section of the BBC and the Digital Camera section of CNET. The content of these pages need not be analyzed or understood in order to form the basis of a profile—collaborative filtering systems may use commonalities between users and their histories to identify good recommendation partners and recommendable content.

Furthermore the web content recommendation system can also automatically categorize the URLs identified. By recording the on-portal preferences of the users using navigator profile preferences or user community preferences the system can build up a picture of the types of user who find this URL interesting. On-portal user profiles may be built up based on the user's consumption of various content on the portal (e.g. page of the website). This content may be tagged using user community preferences (UCPs) such as sports, music, etc. These UCPs may then represent user's interest in various types of content. These content tags can then be used to categorize the selected URLs based on the most common UCPs of the users that visit it.

In addition, the system can distinguish between individual user preferences and group user preferences. In this way, it can recommend a personal or intranet site frequented by one user to only that user while recognizing sites held in common between many users as candidates for wider consumption.

In order to identify off-portal URLs to recommend to a user the web content recommendation system may focus on the user's point-of-entry to a website or other content collection and automatically and implicitly learn which pages interest the user based on the user's browsing history and the browsing history of other similar users. The system may optionally monitor groups of users (e.g. communities of users) to determine which URLs are of importance to the group. The system may further automatically recognize URLs and assets which should remain private to a user, based on user history, to that of its peers. For example, URLs may optionally be required to achieve a repeated level of visibility amongst a group of users, before being recommended within the group.

Figure 3:
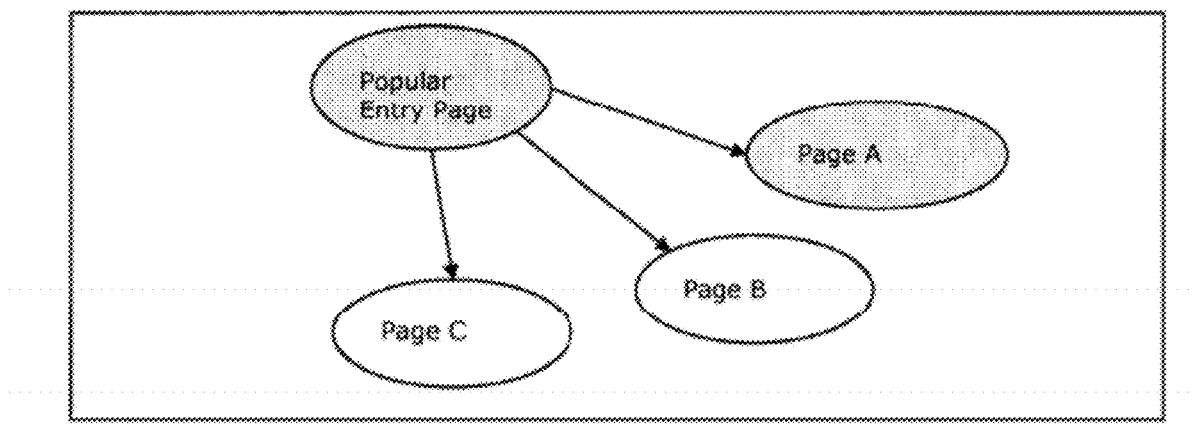
FIG. 3 shows a system for tracking a number of visits by the user directed from a page of a website to each subpage linked to by the page, in accordance with another embodiment.

As an option, the web content recommendation system may only applied to popular websites who exceed a certain number of pages. This filter may identify popular sites with a range of pages that will benefit most from this algorithm. For example, assuming that a domain X is chosen, then for this domain, all entry pages (pages that people start browsing from) may be identified and all links that go out of this page to other subpages within the domain may be identified (see FIG. 3).

If one subpage is predominantly popular with the user or group of users (e.g. is visited more than a threshold amount with respect to the other subpages) then the subpage may become the best entry point. The process then continues recursively until a parent is found who has no one popular child but rather many.

To give an example, if a user goes to MyNews.com everyday, this has many links to a variety of sub pages. The user then typically browses to the Sports section then the Football section which in turn has a series of subpages. Of these, the user typically chooses the World Cup page. This page also has a series of links to subpages but the user does not favor any particular one but rather browses and reads various content pages. The web content recommendation system may start at the homepage as the most popular entry point (although the most popular page need not necessarily be the home page—it could be the Sports page). It may then determine the subpages linked to by this page.

Figure 4:
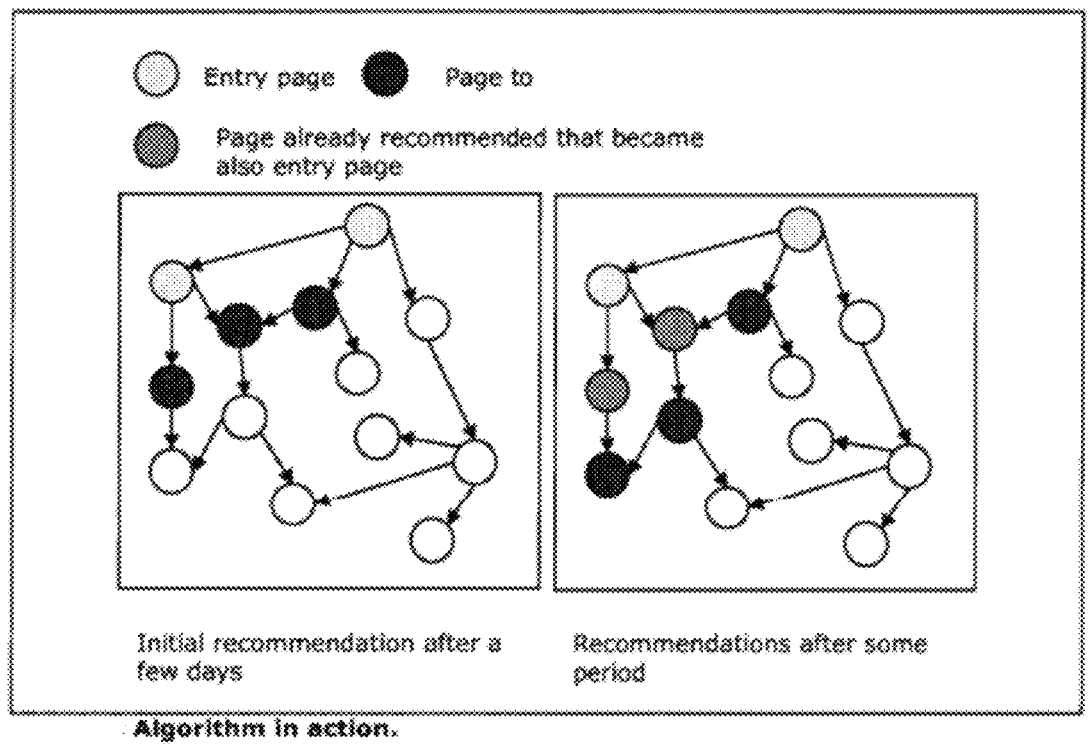
FIG. 4 shows a system for automatically redirecting the user to the new entry page during subsequent visits by the user to the website, in accordance with yet another embodiment.

It may further discover that the user frequently goes to the Sports page. This may then become the best entry point to recommend to the user. The system further analyzes where the user browses from here and discovers that the user browses frequently to the football page. This then becomes the best entry point and hence page recommendation for the user. The process continues until the system reaches the World Cup page at which point it can refine its recommendation no further since the user does not favor any one subpage. This recursive strategy may stabilize after a few rounds and is illustrated in FIG. 4. Once some children of popular entry pages are recommended, then they may become entry pages as well and their children can be also recommended. Of course, children may optionally be required to exceed some predetermined popularity threshold in order to be recommended.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium encoded with a computer program, comprising:
   computer code for directing a user to an entry page of a website having a page uniform resource locator (URL), the entry page including links to a plurality of subpages each having a subpage URL that is different than the entry page URL, where each of the plurality of subpages is an individual page of the website distinct from the entry page and distinct from each of the other plurality of subpages;
   computer code for tracking a number of visits by the user directed from the entry page to each of the subpages;
   computer code for designating one of the subpages with a highest number of visits as a new entry page for the user, where the new entry page is a page initially presented to the user upon entry of the user to the website, and where the designating is performed only if the one of the subpages is visited by the user more than a threshold amount in comparison to visits by the user to other ones of the subpages, wherein the one of the subpages is designated as the new entry page by eliminating an effect of repeating navigations among intermediary subpages which the user undergoes in order to arrive at the one of the subpages that is a destination subpage; and
   computer code for automatically redirecting the user from the entry page URL to the subpage URL of the new entry page during subsequent visits by the user to the website.

2. The non-transitory computer readable medium of claim 1, further comprising computer code for using the subpage URL of the new entry page as a basis of a user profile of the user.

3. The non-transitory computer readable medium of claim 2, wherein the subpage URL of the new entry page is automatically categorized by identifying one or more types of users who find the URL interesting.

4. The non-transitory computer readable medium of claim 3, wherein the subpage URL of the new entry page is automatically categorized utilizing content tags of the new entry page.

5. The non-transitory computer readable medium of claim 1, further comprising computer code for automatically recognizing URLs and assets that are to remain private to the user with respect to peers of the user, based on a user history of the user, where the computer program is operable such that URLs are required to achieve a repeated level of visibility amongst the peers of the user, before being recommended to the peers of the user.

6. The non-transitory computer readable medium of claim 1, wherein the one of the subpages is designated based on a browsing history of the user and a browsing history of other users.

7. The non-transitory computer readable medium of claim 1, further comprising computer code for monitoring a group of users for determining URLs of importance to the group.

8. The non-transitory computer readable medium of claim 1, further comprising determining a number of pages of the website.

9. The non-transitory computer readable medium of claim 8, further comprising comparing the number of pages of the website to a threshold number.

10. The non-transitory computer readable medium of claim 9, wherein the tracking, designating, and redirecting are only performed if the number of pages of the website exceeds the threshold number.

11. The non-transitory computer readable medium of claim 10, wherein the tracking, designating, and redirecting are performed for each entry page of the website.

12. The non-transitory computer readable medium of claim 1, further comprising:
   computer code for tracking activity of each of a plurality of users of a community on each of a plurality of webpages of the website, each of the users of the community sharing at least one common interest;
   computer code for selecting one of the webpages based on the activity, the selected webpage being held in common in an activity profile history of a predefined number of the users; and
   computer code for recommending the selected webpage to the community of users.

13. The non-transitory computer readable medium of claim 1, further comprising computer code for categorizing at least one of the subpage URLs included on the page of the website by:
   recording preferences, using a plurality of user community preferences, of a plurality of users that have visited the page of the website;
   monitoring the plurality of users' consumption of content on the page of the website;
   tagging the consumed content using the plurality of user community preferences; and
   categorizing the at least one of the subpage URLs utilizing the consumed content tags based on at least a most common user community preference of the plurality of users that visited the subpage having the at least one of the subpage URLs.

14. The non-transitory computer readable medium of claim 13, wherein the user community preferences represent types of content in which a community of users is interested.

15. The non-transitory computer readable medium of claim 1, wherein the entry page includes a homepage of the website.

16. The non-transitory computer readable medium of claim 15, wherein each of the subpages includes a section of the website other than the homepage.

17. A method, comprising:
   directing a user to an entry page of a website having a page uniform resource locator (URL), the entry page including links to a plurality of subpages each having a subpage URL that is different than the entry page URL, where each of the plurality of subpages is an individual page of the website distinct from the entry page and distinct from each of the other plurality of subpages;

tracking a number of visits by the user directed from the entry page to each of the subpages;

designating one of the subpages with a highest number of visits as a new entry page for the user, where the new entry page is a page initially presented to the user upon entry of the user to the website, and where the designating is performed only if the one of the subpages is visited by the user more than a threshold amount in comparison to visits by the user to other ones of the subpages, wherein the one of the subpages is designated as the new entry page by eliminating an effect of repeating navigations among intermediary subpages which the user undergoes in order to arrive at the one of the subpages that is a destination subpage; and automatically redirecting the user from the entry page URL to the subpage URL of the new entry page during subsequent visits by the user to the website.

18. A system, comprising:

a hardware processor for:

directing a user to an entry page of a website having a page uniform resource locator (URL), the entry page including links to a plurality of subpages each having a subpage URL that is different than the entry page URL, where each of the plurality of subpages is an individual page of the website distinct from the entry page and distinct from each of the other plurality of subpages, tracking a number of visits by the user directed from the entry page to each of the subpages, designating one of the subpages with a highest number of visits as a new entry page for the user, where the new entry page is a page initially presented to the user upon entry of the user to the website, and where the designating is performed only if the one of the subpages is visited by the user more than a threshold amount in comparison to visits by the user to other ones of the subpages, wherein the one of the subpages is designated as the new entry page by eliminating an effect of repeating navigations among intermediary subpages which the user undergoes in order to arrive at the one of the subpages that is a destination subpage, and automatically redirecting the user from the entry page URL to the subpage URL of the new entry page during subsequent visits by the user to the website.

19. The system of claim 18, wherein the processor is coupled to memory via a bus.

* * * * *